United States Patent
Rutz et al.

[11] Patent Number: 6,117,320
[45] Date of Patent: Sep. 12, 2000

[54] PARALLEL FILTERS FOR PLASTIC MELTS

[75] Inventors: Andreas Rutz, Lindau; Friedrich Mueller, Remscheid, both of Germany

[73] Assignee: Lindauer Dornier Gesellschaft mbH, Lindau, Germany

[21] Appl. No.: 09/321,338

[22] Filed: May 27, 1999

[30] Foreign Application Priority Data

May 28, 1998 [DE] Germany ............... 198 23 765

[51] Int. Cl.[7] .......................... B01D 29/52; B01D 29/96
[52] U.S. Cl. ...................... 210/232; 210/249; 210/340; 210/420; 210/450
[58] Field of Search .................. 210/232, 234, 210/235, 249, 340, 341, 420, 435, 436, 450; 425/197, 198, 199

[56] References Cited

U.S. PATENT DOCUMENTS 2,656,930  10/1953  Vries .
3,455,357  7/1969   Zink .
3,727,767  4/1973   Itter et al. .
5,536,399  7/1996   Kaneshige .

FOREIGN PATENT DOCUMENTS 487730    5/1970  Switzerland .
19524340  1/1996  United Kingdom .

Primary Examiner—Matthew O. Savage
Attorney, Agent, or Firm—W. F. Fasse; W. G. Fasse

[57] ABSTRACT

A filter for filtering plastic melt prior to feeding the melt into an extruder nozzle, for example a thermoplastic film extruder nozzle, has preferably two filter housings for holding respective exchangeable filter cartridges. Both filter housings are articulated by hinges to a column mounting so that one filter housing can be serviced while the other filter housing with its filter cartridge is in a filtering position and vice versa. A single filter may be used alternatively. In both instances the column mounting may include at least one, preferably two, mounting columns.

21 Claims, 1 Drawing Sheet

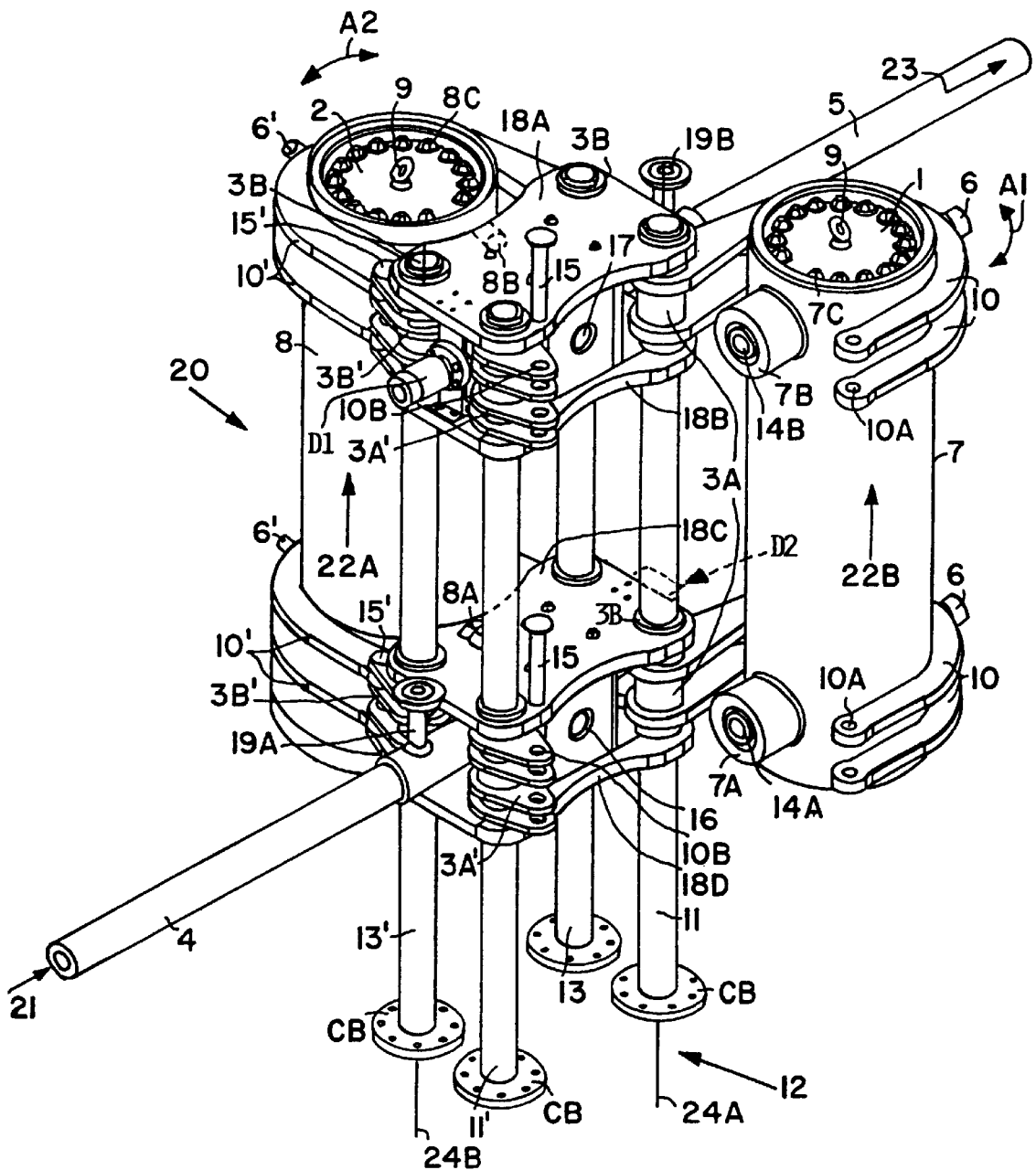

# PARALLEL FILTERS FOR PLASTIC MELTS

PRIORITY CLAIM

This application is based on and claims the priority under 35 U.S.C. §119 of German Patent Application 198 23 765.0-16, filed on May 28, 1998, the entire disclosure of which is incorporated herein by reference.

FIELD OF THE INVENTION

The invention relates to large surface area filters for plastic melts, particularly thermoplastic melts that are supplied from an extruder into a melt filter for producing plastic films. The filter may be a single filter or a double filter.

BACKGROUND INFORMATION

Single melt filters are used on the one hand where a continuous film production is not possible or not necessary so that an interruption of the production due to changing of filter cartridge or other maintenance work is acceptable. Such single melt filters are also used in a second filtering stage with a fine filtering cartridge downstream of a double melt filter system. Customarily the double melt filter is positioned between a melt pump and a film laminating extruder or a melt pump and a melt film extruder. The single melt filter is positioned downstream of the melt pump as close as possible to the extrusion nozzle. Downstream of the extrusion nozzle normally a cooling roller is arranged which cools the extrudate to form the film which then proceeds into a stretching system for further treatment.

Large surface area melt filters include conventionally a filter housing for holding an exchangeable filter cartridge. Double filters normally include melt valves arranged between two filter housings. The filter cartridges which are equipped with filtering elements must be removed from the filter housing for cleaning, whereby the filter housing remains in a fixed position in which it is heated either electrically or by a hot liquid or by steam. In order to assure an extrusion operation free of leakage, it is necessary that the melt inlets and outlets of the filter housings and their cartridges are pressed with relatively large forces into or against centering or sealing surfaces which contact the inlet and outlet of the filter housing. In order to produce the required high press-on forces, large dimension pressure screws or wedge-shaped rapid coupling connector are used. Due to the large forces and their repeated application and release, the centering and sealing surfaces must satisfy special conditions. To be able to satisfy these conditions it is necessary to carefully clean these surfaces at each cartridge exchange. Furthermore, it is necessary to carefully clean the melt inlets and outlets of the filter housings that are installed in a fixed position while a filter cartridge is withdrawn from a filter housing and then cleaned in a special room prepared or equipped for such cleaning operation.

It is a disadvantage of conventional filter devices for extruders that the space available around the inlets and outlets of the filter housings, is rather inadequate for the above mentioned cleaning operations. This lack of accessibility is aggravated by the fact that the operating temperature of the extrudate is about 800° C. which requires a special dexterity of the maintenance personnel which must work under adverse conditions due to high heat radiation.

Furthermore, no damage may be caused to the surfaces that come into contact with the melt, particularly the sealing surfaces between the filter housing inlet and outlet and the valves. Avoiding such mechanical damage during cleaning and maintenance work is difficult under the above mentioned working conditions. Further, not properly cleaned melt channels can contaminate the extrudate when the filter is restarted after a cleaning operation. Such contamination of the melt in turn results in a faulty film product that can lead to tearing of the extruded film and the like.

Efforts have been made heretofore to increase the accessibility for cleaning purposes, whereby a conventional double filter is so constructed that both melt valves, the inlet valve and the outlet valve, are positioned separate from the filter housings to which the valves are connected through pipelines. The two filter housings are spaced from each other, just as the valves are. Such a construction makes it possible to supply melt to the first filter through a three-way valve and a pipeline until the first filter requires replacement or cleaning of its cartridge. The melt discharge pipe downstream of the filter is also a respective pipeline with a three-way discharge valve. When it becomes necessary to clean the first filter, the two inlet and outlet three-way valves are switched over in a determined, synchronized sequence for continuing filtration of the melt through the second filter. When the switch-over of the two three-way valves is completed, the melt flows through the inlet three-way valve with a respective pipeline through the second filter with its filter cartridge and through a further pipeline to the three-way outlet or discharge valve.

The just described conventional construction has its advantages as far as accessibility for cleaning purposes is concerned. However, a substantial structural volume with pipelines and three-way valves requires a correspondingly substantial space. Moreover, at least four pipelines with at least eight couplings requiring respective sealing devices must be cleaned. The filter must be mounted displaceable in the system in order to remove the pipelines from the system and to make the pipe couplings accessible for the cleaning. This requirement calls for an additional space and entails higher manufacturing, assembly and maintenance costs. The pipeline assembly for connecting the two three-way valves with the two filters entail unavoidable detouring of the extrusion melt, since the melt does not flow along a straight conduit. Hence, the feeding or transportation of the melt requires additional costs as far as energy consumption by the conveying pump and heating of the system are concerned.

Another conventional double filter system has a more compact assembly with but one valve having a double valve plug between the two filters, whereby the two filters are linearly displaceable in the system. Such a construction avoids the disadvantage of long pipelines and many pipe couplings, yet it requires, in spite of the more compact construction, a substantial space around the system because the filter housings with the filter cartridges must be displaced away from the two-way valve for cleaning of the couplings and the filter cartridges. During the cleaning operation the operating personnel is exposed to substantial thermal effects because the operator must perform his job by standing between the displaced hot filter housing and the remaining hot sections of the system. In addition to high manufacturing and construction or assembly costs, the operating costs are also contributing to a substantial disadvantage. A total of six melt detours in the piping system further contributes to the increased costs especially in terms of a higher power consumption.

Swiss Patent CH 487,730 (Zink) discloses a melt filter with two filter chambers that are tiltable or displaceable circumferentially about a mounting body that is provided with melt passages, whereby separate inlet and outlet melt valves are avoided. The mounting body itself is provided with melt passages that can be aligned with one or the other filter housing thereby providing the required valve functions. Each housing carries an exchangeable filter cartridge. Thus, by tilting the filter housings about the central axis of the mounting body, one or the other filter housing can be brought into a position for cooperation with an extruder and with a mold. For this purpose each filter housing is equipped with an inlet section connectable to the extruder and with an outlet section connectable to the mold, whereby the inlet and outlet sections provided respective melt inlet and melt outlet channels. Such a construction has the advantage that separate melt inlet and outlet valves are avoided and that one filter cartridge may be exchanged while the other filter cartridge in its housing is in a working position. However, maintenance and cleaning operations are aggravated because of the limited space available in the inlet and outlet area of the conventional filter system according to the Swiss Patent and due to the fact that a high radiation heat from the filter housing that is in a working position aggravates the working conditions. Thus, a proper maintenance and thorough cleaning operation is only possible when the melt flow is completely interrupted and the filter mounting body is tilted or shifted into the maintenance position with both filter housings.

OBJECTS OF THE INVENTION

In view of the foregoing it is the aim of the invention to achieve the following objects singly or in combination:

- to construct a large surface area filter system for plastic melts, particularly thermoplastic melts in such a way that the above outlined drawbacks of the prior art are avoided, particularly the exchange of filter cartridges shall be facilitated;
- to reduce the filter cleaning and maintenance work to achieve an improved efficiency while simultaneously increasing the safety features of the system, thereby reducing risks to the operating personnel;
- to avoid mechanical damage to the sealing surfaces, especially those contacting the melt, to thereby improve the output quality of the extruded film material;
- to avoid or at least substantially reduce the presence of contaminating particles after a cleaning and cartridge exchange has taken place; and
- to provide a column mounting that in its basic construction is suitable for a filter system with a single filter cartridge housing or for a double filter system with two filter cartridge housings.

SUMMARY OF THE INVENTION

A large surface plastic melt filter particularly for cooperation with a melt extruder is characterized according to the invention by at least one, preferably two, filter housings which are hinged for a tilting movement about a hinging axis provided by a column mounting. The tiltable filter housing is provided with a holding member such as a bail that cooperates with a hinge lock so that the filter housing that is currently in an operating position can be locked to the column mounting. In the embodiment with two filter housings two hinge locks are operable independently of each other so that while one filter housing is in a filtering position, the other filter housing may be tilted out of the operating filtering position into a maintenance cartridge exchange or cleaning position and vice versa.

By tilting a filter housing about its hinging axis, for example by an angle of 90°, the inlet and outlet sealing surfaces of the respective melt valves and of the filter cartridge become easily accessible without requiring substantial space in the vicinity of the filtering system compared to conventional systems in which the filter housings must be displaced linearly away from the valves, for the cartridge exchange. Where a linear displacement is required in conventional systems, the spacing between the operating position and the maintenance position of the filter housing must be such that an operator can step into that space while at the same time being able to use the required tools such as cleaning brushes having handles of substantial length sufficient to clean the interior of the filter housings.

The tilting of one filter housing or of one or the other filter housing about a journal axis or hinge axis requires very little space because the sealing surfaces that need to be cleaned are positioned substantially at a right angle relative to each other, thereby facilitating an easy work that can be done with free access to the respective filter housing with its sealing surfaces. This free access for the work to be performed has the advantage that the work itself can be done quicker and more thoroughly while simultaneously providing the maintenance personnel with an advantageous working position and respective working conditions. The available space makes the work safer and less tiring. Injuries due to contact with sharp edges or due to thermal influences are avoided. The maintenance personnel can assume the most convenient position during working so that long term adverse influences or damages are avoided. Moreover, these convenient working conditions reduce the errors made by the maintenance personnel particularly with regard to contamination particles and/or mechanical damage to the melt contacting surfaces of the components especially the sealing elements are avoided since these convenient working conditions permit maintaining concentrated attention by the maintenance personnel for longer periods of time than was possible heretofore.

Furthermore, the following features reduce the operating costs of the present filter systems. The compact construction which permits short travel distances for the melt from the extruder to the filter system, requires few melt detours. Easily exchangeable filter cartridges and exchangeable sealing elements may be used. All couplings may be accomplished by so-called quick couplings, clamping couplings, and screwed connections. Moreover, the compact construction with short distances to be travelled by the melt keeps the production of reject film sections low. Incidentally, the short flow distances for the melt are assured by connecting the filters to the valves and the valves to the melt extruder through short substantially straight pipes. Further, only a few melt contacting surfaces and sealing surfaces need to be cleaned so that the danger of contaminating particles entering the system is reduced. Similarly, the cleaning operation is easily performed so that extrudate remainders or other contaminating particles conventionally caused by mechanical damage to the surfaces to be cleaned, are substantially avoided and thus do not enter into the next operating cycle of a cleaned filter section.

BRIEF DESCRIPTION OF THE DRAWINGS

In order that the invention may be clearly understood it will now be described in connection with example embodiments, with reference to the accompanying drawings, wherein the single FIGURE shows a perspective view of a large surface area double filter according to the invention having two filter housings hinged to a column mounting.

DETAILED DESCRIPTION OF PREFERRED EXAMPLE EMBODIMENTS AND OF THE BEST MODE OF THE INVENTION

The single FIGURE shows a double filter, however, the construction of a single filter is substantially the same, except that either the left-hand or right-hand filter housing with its mounting elements is omitted.

The FIGURE shows filter system 20 with a first filter cartridge 1 removably mounted in a first filter housing 7. Screws 7C hold the filter cartridge 1 in the first housing 7. When the screws 7C are released, the filter cartridge 1 can be lifted out of the housing 7 by a lifting mechanism not shown. The lifting mechanism engages, for example, an eye bolt 9. Similarly, a second filter cartridge 2 is mounted in a second filter housing 8, whereby screws 8C and the eye bolt 9 serve for the same purposes just described. As shown in the drawing FIGURE, the filter housing 7, 8 each include a peripheral wall that completely surrounds a respective axis. The first filter housing 7 is shown in a service position tilted counterclockwise out of a working or filtering position as indicated by the arrow A1. The filter housing 7 can be brought back into the working or filtering position by tilting the housing 7 clockwise also as indicated by the arrow A1. In the shown maintenance position of the filter housing 7, its inlet port 7A with its exchangeable sealing element 14A is disengaged from a melt inlet valve 16. Similarly, the melt discharge port 7B with its exchangeable sealing element 14B is disengaged from the melt discharge valve 17. The valves 16 and 17, their mounting, and the sealing elements 14A, 14B will be described in more detail below.

The second filter housing 8 is shown in a filtering position in which the housing 8 is tilted counterclockwise so that its melt inlet 8A engages the melt inlet valve 16 and its melt outlet 8B engages the melt discharge valve 17. The filter housings 7 and 8 can be tilted manually independently of one another as indicated by the arrows A1 and A2.

Melt from an extruder, not shown, flows through a pipe 4 in the direction of the arrow 21 to the melt inlet valve 16 which in the position shown communicates with the melt inlet 8A of the second filter housing 8. With regard to the filter housing 7, the valve 16 is closed as long as the filter housing 7 assumes the tilted out maintenance position shown in the FIGURE. The melt flows through the filter cartridge 2 in the housing 8 in the direction of the arrow 22A and out of the filter housing 8 through the discharge port 8B through the valve 17 into a discharge pipe 5 as indicated by the arrow 23. The discharge pipe 5 is connected to an extruder nozzle, for example, not shown.

Both filter housings 7 and 8 are hinged to a column mount 12 formed for example by four columns 11, 11', 13 and 13'. Even a single column may be sufficient if the two housings are axially displaced along the single column. However, a more involved valving mechanism may then be required. One or two columns may be sufficient where the filter system has only one filter housing.

Referring to the FIGURE, each column has a column base CB that is mounted to a floor or other support not shown. The columns 11, 11'; 13, 13' are secured to one another by an upper yoke including upper yoke plates 18A and 18B forming a pair, and by a lower yoke including lower yoke plates 18C and 18D forming a second pair. Preferably, the upper and lower yokes are vertically adjustable relative to each other for precisely positioning the valves 16 and 17 to a predetermined on-center spacing from each other that corresponds to the on-center spacing between inlet and outlet ports 7A and 7B; 8A and 8B of the respective filter housings 7, 8. Such an adjustment can be accomplished, for example by a spindle and spindle drive D1 and D2 that interconnect the respective yoke pairs or yoke sections. The melt valves 16 and 17 are mounted in the respective yoke sections. More specifically, the valve 17 is mounted between the yoke plates 18A and 18B. The valve 16 is mounted between the yoke plates 18C and 18D. Further, drive elements not shown for operating the valves 16 and 17 are also mounted to the respective yoke sections or in other convenient positions.

The filter housing 7 is held by at least one, preferably two, bails 10. One end of each bail is secured by a hinge 3A to the column 11. Preferably, the hinges 3A are positioned on the respective column between the yoke plates 18A, 18B at the upper end and 18C, 18D at the lower end. The free end of each bail 10 is provided with locking holes 10A that cooperate with respective locking holes 10B in hinge locks 3A' journalled to the column 11'. When the filter housing 7 is tilted clockwise to bring it into an operating position, the holes 10A in the bails 10 are aligned with the holes 10B in the hinge locks 3A' and pins 15 are inserted into the aligned holes 10A, 10B. A clamping screw 6 in each bail 10 bears against the filter housing 7. These screws 6 are tightened so that the inlet port 7A and the outlet port 7B of the filter housing 7 are properly pressed and sealed against the valves 16 and 17. The filtering operation can now continue through the filter cartridge 1 in the housing 7, whereby the melt flow is indicated by the arrow 22B.

When the second filter housing 8 with its cartridge 2 is ready for a maintenance work the above described operation is repeated. For this purpose the clamping screws 6' are released, the bolts 15' are withdrawn and the bails 10' holding the housing 8 can now be tilted clockwise into a maintenance position for removing the filter housing 8.

The filter housings 7 and 8 are conventionally heated either electrically or by a hot liquid or by steam. The seating devices are not shown since they are not part of the invention.

The tightening of the clamping screws 6 or 6' makes sure that the sealing surfaces of the sealing elements 14A and 14B in the melt inlet port 7A and in the melt outlet port 7B respectively provide a properly centered seal relative to the melt inlet valve 16 and the melt outlet valve 17. The screws are tightened until the required surface pressure or sealing pressure is sufficient to avoid any leaks. These sealing elements 14A and 14B and the sockets in which they sit in the inlets 7A, 8A and outlets 7B, 8B in which the sealing elements 14A, 14B sit are so constructed that a self-centering is assured when the screws 6, 6' are tightened. The sealing elements 14A and 14B are replaceable elements that can assume even a slightly tilted position in the sockets formed by the inlet ports 7A and the outlet ports 7B. This feature makes sure that different heat expansions between the lower inlet port and the upper outlet port are compensated by a length correction permitted by a slight slanting of the sealing elements 14A, 14B.

Once the filter housing 7 or the filter housing 8 has been brought into the tilted-out maintenance position the centering surfaces of the valves 16 and 17 and the sealing elements 14A and 14B are readily accessible for cleaning. The sealing elements 14A, 14B can be easily removed and replaced. The valves 16 and 17 are also easily accessible for cleaning and this also applies to the pipes 4 and 5.

Venting valves 19A and 19B are connected to the melt inlet pipe 4 and the melt outlet pipe 5 respectively to permit a proper venting after a filter cartridge exchange.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A plastic melt double filter comprising a first filter housing (7) having a peripheral wall that completely surrounds an axis for holding a first filter cartridge (1), a second filter housing (8) for holding a second filter cartridge (2), said first filter housing having a first melt inlet (7A) and a first melt outlet (7B), said second filter housing (8) having a second melt inlet (8A) and a second melt outlet (8B), a melt inlet valve (16) positioned for cooperation with said first and second melt inlets (7A, 8A), a melt outlet valve (17) positioned for cooperation with said first and second melt outlets (7B, 8B), a column mounting (12) for holding said first filter housing (7) and said second filter housing (8), wherein said inlet and outlet valves (16, 17) are mounted to said column mounting (12), a first hinge (3A) tiltably securing said first filter housing (7) to said column mounting (12) and a second hinge (3B) tiltably securing said second filter housing (8) to said column mounting (12) and clamping means (10, 10', 3A', 3B', 6) for holding said filter housings (7, 8) in an operating position, whereby said first filter housing (7) and said second filter housing (8) can be brought independently of each other into respective valve cooperating positions for cooperating with said inlet valve (16) and with said outlet valve (17), so that one filter housing can be serviced while the other filter housing is in said valve cooperating position and vice versa.

2. The double filter of claim 1, wherein said column mounting (12) comprises at least two columns (11, 13) for holding said first and second filter housings (7, 8) respectively.

3. The double filter of claim 1, wherein said first and second hinges (3A, 3B) have a rotation angle of at least 9020 about a rotational axis defined by said column mounting (12).

4. The double filter of claim 1, wherein said clamping means comprise at least one first bail (10) and one second bail (10') connected to said first hinge (3A) and to said second hinge (3B) respectively, said first bail (10) articulating said first filter housing (7) to said column mounting (12) and said second bail (10') articulating said second filter housing (8) to said column mounting (12).

5. The double filter of claim 4, comprising two of said first bails (10) securing said first filter housing (7) to said column mounting (12) and two of said second bails (10') securing said second filter housing (8) to said column mounting (12).

6. The double filter of claim 5, wherein one of said two first bails (10) is positioned at each end of said first filter housing (7), and wherein one of said two second bails (10') is positioned at each end of said second filter housing (8).

7. The double filter of claim 5, wherein each of said first and second bails (10, 10') loops around the respective filter housing (7, 8) for at least 180°.

8. The double filter of claim 5, wherein said clamping means further comprise a clamping screw (6) passing through each first and second bail (10, 10') for locking the filter housings (7, 8) with their inlets and outlets into sealed cooperation with the respective melt inlet valve (16) and the respective melt outlet valve (17).

9. The double filter of claim 5, wherein said column mounting (12) comprises first and second columns (11, 13), wherein said first bail (10) is articulated to said first column (11) by said first hinge (3A), and wherein said second bail (10') is articulated to said second column (13) by said second hinge (3B).

10. The double filter of claim 9, comprising two of said first hinges (3A) for articulating each of said two first bails (10) to said first column (11), and two of said second hinges (3B) for articulating each of said two second bails (10') to said second column (13), and wherein said column mounting (12) comprises, in addition to said first and second columns (11, 13), a third column (11'), a fourth column (13'), and at least two yokes (18A, 18B) rigidly securing said first, second, third and fourth columns to one another to form said column mounting (12), and wherein said clamping means comprise hinge locks (3A' and 3B') articulated to said third and fourth columns (11', 13'), and means (15) for securing said bails (10, 10') to said hinge locks (3A', 3B') when said bails hold the respective filter housing (7, 8) in an operating position and for releasing said bails (10, 10') from said hinge locks (3A', 3B') for tilting said filter housings into a maintenance position.

11. The double filter of claim 10, wherein said column mounting (12) comprises four yokes (18A, 18B, 18C, 18D) arranged in a first pair (18A, 18B) of yokes and in a second pair (18C, 18D) of yokes holding said four columns (11, 11; 13, 13') to form said column mounting (12), wherein said melt inlet valve (16) is mounted between yokes of said second pair (18C, 18D) and wherein said melt outlet valve (17) is mounted between said yokes of said first pair (18A, 18B).

12. The double filter of claim 10, wherein said bails (10, 10') have free bail ends with first holes (10A) through said free bail ends, wherein said hinge locks (3A', 3B') have free ends with second holes (10B), wherein said first and second holes (10A, 10B) align with each other when said bails are in a filter housing clamping position relative to said hinge locks (3A', 3B'), and further comprising a locking pin (15) engaging said first and second holes when said bails are in said filter housing clamping position.

13. The double filter of claim 1, wherein said first and second filter inlets (7A, 8A) comprise quick couplers including exchangeable sealing elements (14A) for coupling said melt inlets (7A, 8A) to said melt inlet valve (16), and wherein said first and second filter outlets (7B, 8B) comprise further quick couplers including exchangeable sealing elements (14B) for coupling said outlets (7B, 8B) to said melt outlet valve (17).

14. The double filter of claim 1, wherein said column mounting (12) comprises two columns (11, 13) and two cross yokes (18A, 18D) holding said two columns together with a spacing between said two cross yokes, wherein said melt inlet valve (16) is mounted to one of said two cross yokes and said melt outlet valve (17) is mounted to the other of said two cross yokes, and further comprising position adjustment means connected to said cross yokes for adjusting said spacing between said two cross yokes, whereby an on-center spacing between said melt inlet valve (16) and said melt outlet valve (17) is adjustable.

15. A plastic melt filter comprising a filter housing (7) having a peripheral wall that completely surrounds an axis for holding a filter cartridge (1), said filter housing having an inlet (7A) for melt to be filtered and an outlet (7B) for filtered melt, a melt inlet valve (16) positioned for cooperation with said melt inlet (7A), a melt outlet valve (17) positioned for cooperation with said melt outlet (7B), a column mounting (12) for holding said filter housing (7), said melt inlet valve (16) and said melt outlet valve (17), said column mounting (12) comprising at least one column (11) for holding said filter housing (7), at least one hinge (3A) tiltably securing said filter housing (7) to said at least one column (11), and at least one hinge lock (3A') for locking said filter housing (7) to said column mounting, whereby said filter housing (7) can be brought alternately into a first position for cooperating with said inlet valve (16) and with said outlet valve (17) and into a second position for servicing.

16. The filter of claim 15, further comprising two bails (10) connected to said filter housing and two of said hinges (3A) articulating said two bails (10) to said column mounting and two hinge locks (3A') for locking said two bails (10) to said column mounting.

17. The filter of claim 16, wherein said bails (10) have free bail ends with first holes (10A) through said free bail ends, wherein said hinge locks (3A') have free ends with second holes (10B), wherein said first and second holes (10A, 10B) align with each other when said bails (10) are in a filter housing clamping position relative to said hinge locks (3A'), and further comprising a locking pin (15) engaging said first and second holes when said bails are in said filter housing clamping position and said first and second holes (10A, 10B) are aligned with each other.

18. The filter of claim 16, wherein of each of said two bails (10) loops around said filter housing (7) for at least 180° and wherein each bail (10) comprises a clamping screw (6) for locking the filter housing with its inlet and outlet into sealed cooperation with said melt inlet valve (16) and said melt outlet valve (17).

19. The filter of claim 15, further comprising at least two columns (11, 11') forming said column mounting (12) and four yokes (18A, 18B, 18C, 18D) arranged in a first pair (18A, 18B) of yokes and in a second pair (18C, 18D) of yokes holding said two columns (11, 11') to form said column mounting (12), wherein said melt inlet valve (16) is mounted between yokes of said second pair (18C, 18D) and wherein said melt outlet valve (17) is mounted between said yokes of said first pair (18A, 18B).

20. The filter of claim 15, wherein said column mounting (12) comprises two columns (11, 13) and two cross yokes (18A, 18D) holding said two columns together with a spacing between said two cross yokes, wherein said melt inlet valve (16) is mounted to one of said two cross yokes and said melt outlet valve (17) is mounted to the other of said two cross yokes, and further comprising position adjustment means connected to said cross yokes for adjusting said spacing between said two cross yokes, whereby an on-center spacing between said melt inlet valve (16) and said melt outlet valve (17) is adjustable.

21. The filter of claim 15, wherein said melt inlet (7A) comprises a quick coupler including an exchangeable sealing element (14A) for coupling said melt inlet (7A) to said melt inlet valve (16), and wherein said filter outlet (7B) comprises a further quick coupler including an exchangeable sealing element (14B) for coupling said outlet (7B) to said melt outlet valve (17).

* * * * *

UNITED STATES PATENT AND TRADEMARK OFFICE
CERTIFICATE OF CORRECTION

PATENT NO. : 6,117,320
DATED : September 12, 2000
INVENTOR(S) : Rutz, et. al.

It is certified that error appears in the above-indentified patent and that said Letters Patent is hereby corrected as shown below:

Col. 7,      line 7, after "(8)", insert --having a peripheral wall that completely surrounds an axis--;

line 34 (actual line count), after "least", replace "9020" by --90°--.

Signed and Sealed this

Tenth Day of April, 2001

Attest:

NICHOLAS P. GODICI

*Attesting Officer*      Acting Director of the United States Patent and Trademark Office